(12) United States Patent
Splett

(10) Patent No.: US 8,010,160 B2
(45) Date of Patent: Aug. 30, 2011

(54) SYSTEM FOR COMBINING OUTPUT SIGNALS OF TWO BASE STATIONS

(75) Inventor: Armin Splett, Ulm (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 680 days.

(21) Appl. No.: 11/652,517

(22) Filed: Jan. 12, 2007

(65) Prior Publication Data
US 2007/0184876 A1    Aug. 9, 2007

(30) Foreign Application Priority Data
Jan. 12, 2006  (EP) .................................. 06000637

(51) Int. Cl.
  H04B 1/38    (2006.01)
  H04B 1/46    (2006.01)
  H04M 1/00    (2006.01)
  H01Q 1/50    (2006.01)
  H01Q 3/24    (2006.01)
  H01Q 1/12    (2006.01)
(52) U.S. Cl. ....... 455/561; 455/562.1; 455/82; 455/509; 343/858; 343/876; 343/890; 343/891
(58) Field of Classification Search ............... 455/118, 455/226.2, 436, 450, 509, 561, 562.1, 82; 370/330, 324; 375/297; 343/858, 876, 890, 343/891
See application file for complete search history.

(56) References Cited

U.S. PATENT DOCUMENTS

| | | | | |
|---|---|---|---|---|
| 5,774,193 A * | 6/1998 | Vaughan | ................ | 348/723 |
| 5,790,527 A * | 8/1998 | Janky et al. | ................ | 370/330 |
| 6,658,263 B1 * | 12/2003 | Ke et al. | ................ | 455/524 |
| 6,785,558 B1 * | 8/2004 | Stratford et al. | ............... | 455/561 |
| 6,836,647 B2 * | 12/2004 | Rimini et al. | ............... | 455/226.2 |
| 7,043,270 B2 * | 5/2006 | Judd et al. | ................ | 455/561 |
| 7,058,370 B2 * | 6/2006 | Saito et al. | ................ | 455/114.3 |
| 2002/0055345 A1 * | 5/2002 | Wood, Jr. | ................ | 455/277.1 |
| 2003/0058960 A1 * | 3/2003 | Lee | ................ | 375/297 |
| 2004/0137947 A1 | 7/2004 | Nimmo-Smith | | |
| 2004/0219901 A1 * | 11/2004 | Loke | ................ | 455/318 |
| 2006/0083512 A1 * | 4/2006 | Wake | ................ | 398/59 |
| 2006/0094376 A1 * | 5/2006 | Lee et al. | ................ | 455/118 |
| 2008/0045254 A1 * | 2/2008 | Gupta et al. | ................ | 455/509 |

FOREIGN PATENT DOCUMENTS
WO    WO 92/12579    7/1992

* cited by examiner

Primary Examiner — Kamran Afshar
Assistant Examiner — Mong-Thuy Tran
(74) Attorney, Agent, or Firm — Staas & Halsey LLP

(57) ABSTRACT

A transmitter unit which is disposed between the first base station and the antenna arrangement contains a device for aggregate signal forming, a D/A converter and a transmission power amplifier. The first base station is connected on the output side to the device for aggregate signal forming such that a digital output signal of the first base station reaches the device for aggregate signal forming as the first input signal. The device for aggregate signal forming is connected on the output side to the antenna arrangement via the D/A converter and the transmission power amplifier such that an aggregate signal formed by the device for sum forming reaches the antenna arrangement, the aggregate signal being formed from the first digital input signal and a second digital input signal connected to the device for aggregate signal forming. The second base station is connected on the output side to the device for aggregate signal forming via a converting device which forms the second input signal from the output signal of the second base station.

19 Claims, 3 Drawing Sheets

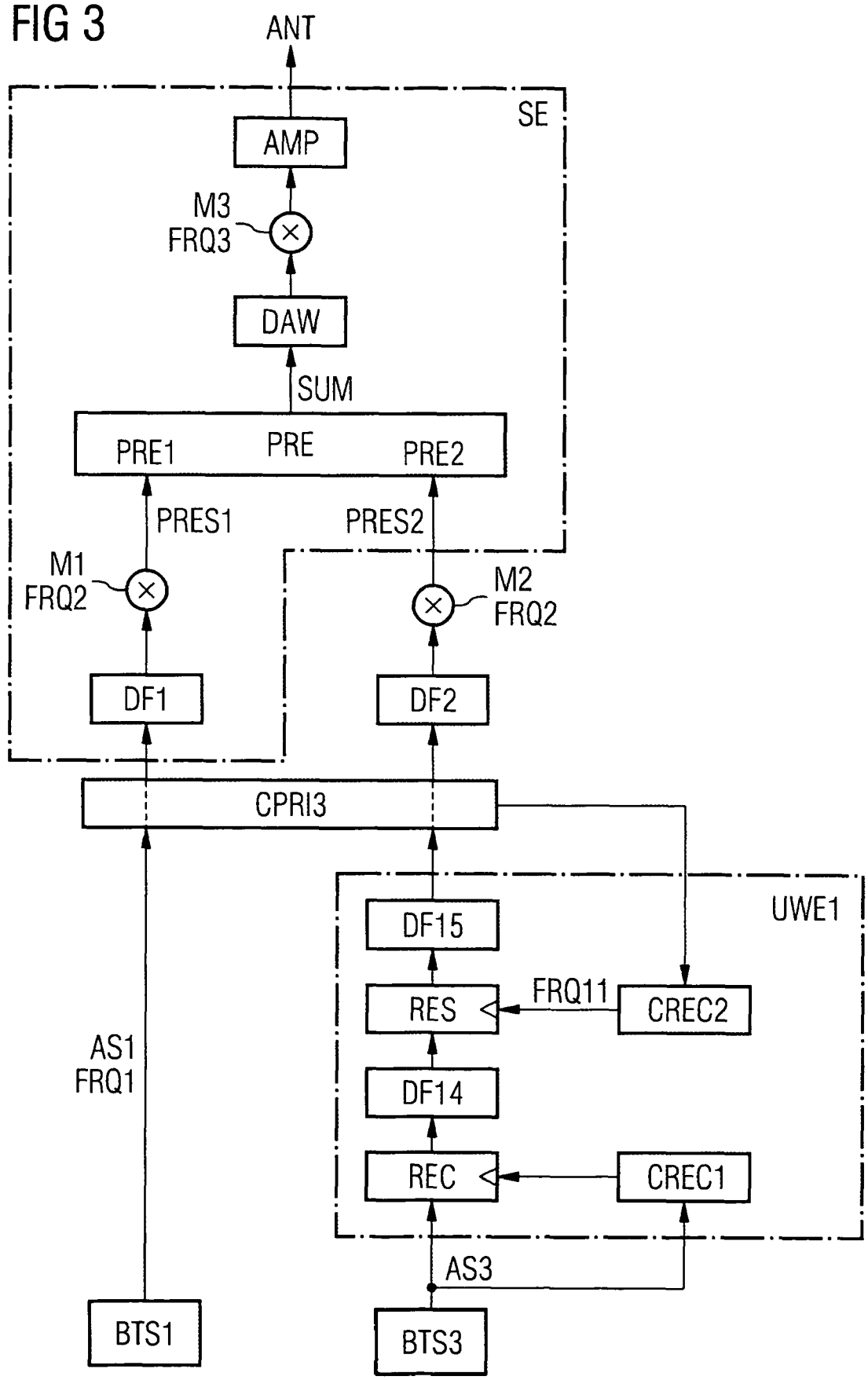

SYSTEM FOR COMBINING OUTPUT SIGNALS OF TWO BASE STATIONS

CROSS REFERENCE TO RELATED APPLICATIONS

This application is based on and hereby claims priority to European Application No. 06000637 filed on Jan. 12, 2006, the contents of which are hereby incorporated by reference.

BACKGROUND

Due to the limited number of suitable antenna locations it will be necessary in the future, with the introduction of new radio communication standards or new radio transmission methods, to combine a plurality of carrier signals from base stations conforming to different radio communication standards and radiate said signals via a common antenna arrangement.

With the method known as "broadband hybrid combining", in the case of low power levels a plurality of carrier frequencies associated with different radio communication standards are combined, amplified and radiated. A highly linear, analog transmission power amplifier is used for the purposes of amplification, a predistortion method possibly being applied in addition for linearization purposes. Transmission power amplifiers of said kind are described in more detail in, for example, "RF Power Amplifiers for Wireless Communications", by Steve C. Cripps, Artech House, Boston, 1999, though said amplifiers can be implemented only at very great cost owing to high technical requirements.

SUMMARY

One possible object of the present invention is to specify a system for cost-effectively combining output signals of a first and a second base station in order to supply the combined output signals to a common antenna arrangement for radiating.

The inventor proposes a system which may make is possible, with a limited amount of effort and expenditure, to combine an output signal of an already installed first base station with an output signal of a second base station that is to be newly added and to radiate said combined signals via a common antenna arrangement.

With the aid of the system it is possible, with a small amount of overhead, to implement arbitrarily small carrier frequency spacings.

It is furthermore possible to achieve a very high overall efficiency, since the signal to be amplified is present as a digital, time-discrete overall signal:

Algorithms which reduce the ratio between peak power on the one hand and average power on the other hand can be applied to the overall signal. Said ratio is known as the "peak-to-average ratio" (PAR). As a result improved levels of efficiency are made possible in the transmission power amplifier.

The present overall signal can be digitally predistorted in order to optimally modulate the final stage of the transmission power amplifier while at the same time realizing a high overall linearity of the amplifier characteristic curve. An improved overall level of efficiency is likewise made possible by said predistortion.

BRIEF DESCRIPTION OF THE DRAWINGS

These and other objects and advantages will become more apparent and more readily appreciated from the following description of the preferred embodiments, taken in conjunction with the accompanying drawings of which:

FIG. 3 shows a third embodiment of the system for combining digital output signals of a first and a second base station.

DETAILED DESCRIPTION OF THE PREFERRED EMBODIMENT

Figure 1:
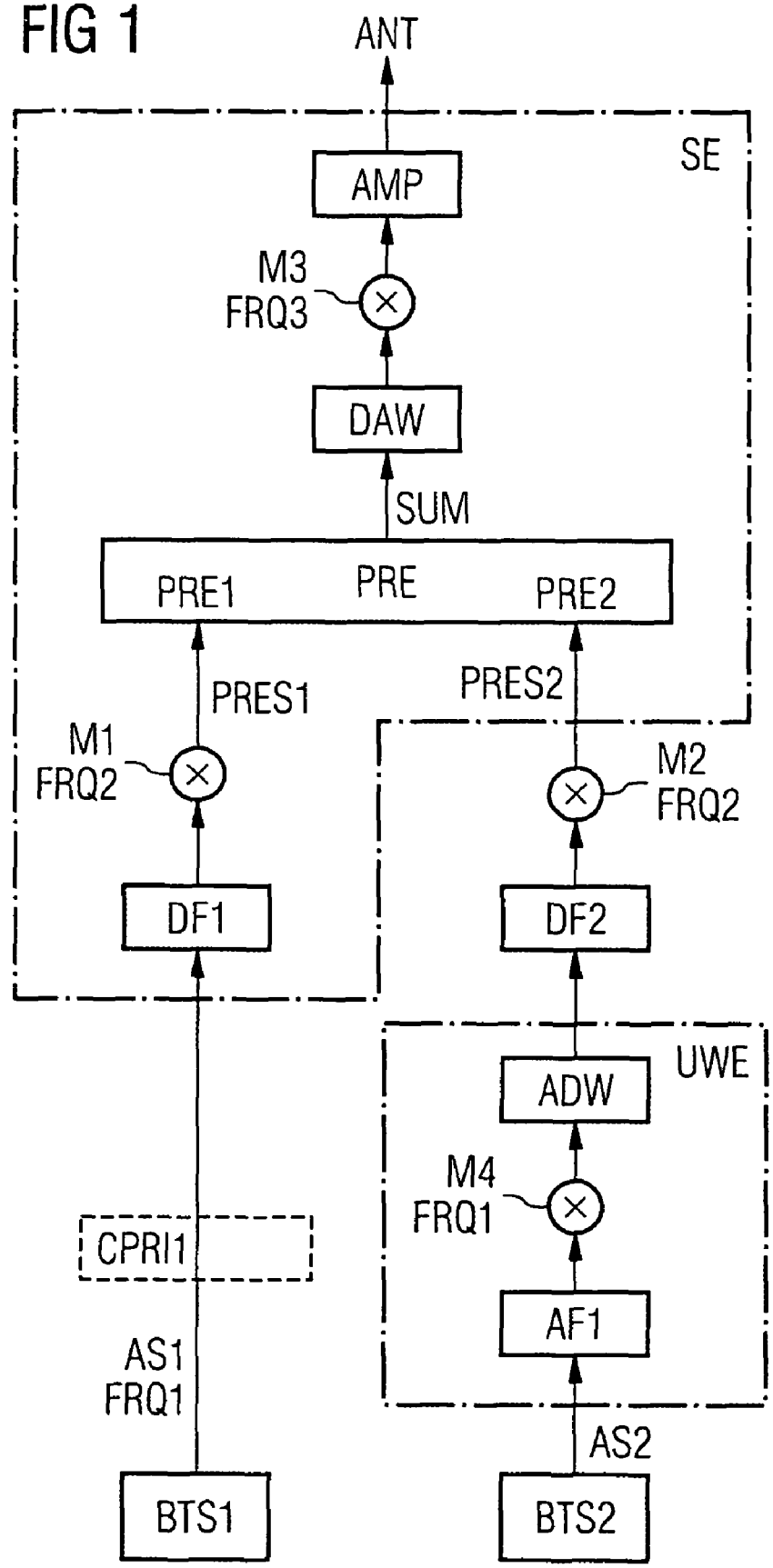
FIG. 1 shows a first embodiment of a system for combining a digital output signal of a first base station and an analog output signal of a second base station according to one potential embodiment of the invention.

Reference will now be made in detail to the preferred embodiments, examples of which are illustrated in the accompanying drawings, wherein like reference numerals refer to like elements throughout.

FIG. 1 shows a first embodiment of the system for combining a digital output signal AS1 of a first base station BTS1 and an analog output signal AS2 of a second base station BTS2, wherein following a signal processing stage that is to be performed the combined signals are intended to reach a common antenna arrangement ANT in order to be radiated.

In this scheme there is disposed between the first base station BTS1 and the antenna arrangement ANT a transmitter unit SE which includes a digital filter DF1, a predistorting device PRE, a D/A (digital/analog) converter DAW and a transmission power amplifier AMP.

In this case the predistorting device PRE has a first input PRE1 and a second input PRE2, with the digital filter DF1 being disposed between the first input PRE1 and the first base station BTS1.

As a result the digital output signal AS1 of the first base station BTS1, which signal is connected to the first digital filter DF1, reaches the predistorting device PRE as the first input signal PRES1.

In this case the input signal PRES1 is assigned, for example, to a first frequency range FRQ1—e.g. a baseband frequency range, an intermediate frequency range or a carrier frequency range.

Via the second input PRE2 a second digital input signal PRES2 is supplied to the predistorting device PRE, the predistorting device PRE forming a predistorted aggregate signal SUM from the first input signal PRES1 and the second input signal PRES2.

Known methods of digital predistortion are used for the predistortion. For example, a "clipping" method is utilized by which a minimal "peak-to-average ratio" PAR is obtained.

The predistorting device PRE is connected to the antenna arrangement ANT via the D/A converter DAW and via the transmission power amplifier AMP connected in series downstream thereof, with the result that the aggregate signal SUM is successfully radiated via the common antenna arrangement ANT.

The second base station BTS2 is connected on the output side via a converting device UWE to the second input PRE2 of the predistorting device PRE in such a way that the analog output signal AS2 of the second base station BTS2 reaches the converting device UWE as the input signal.

The converting device UWE contains a conversion unit to convert the connected analog output signal AS2 of the second base station BTS2 from analog to digital form, said conversion unit in this case being an analog/digital converter ADW. The A/D converter ADW can be connected on the output side directly or indirectly to the second input PRE2 of the predistorting device PRE. The digitally converted output signal of the A/D converter ADW reaches the predistorting device PRE as the second input signal PRES2 via the second input PRE2.

In an advantageous development the converting device UWE also comprises a series circuit including an analog filter AF1 and a mixer M4, the analog output signal AS2 of the second base station BTS2 being connected on the input side to the analog filter AF1.

The analog output signal AS2 of the second base station BTS2 can be converted to, for example, the first frequency range FRQ1 by the mixer M4.

Advantageously the first digital filter DF1 is connected via a mixer M1 to the first input PRE1 of the predistorting device PRE, while the A/D converter ADW is connected on the output side to the second input PRE2 of the predistorting device PRE via a series circuit including a digital filter DF2 and a mixer M2. The supplied signals are converted to, for example, a second frequency range FRQ2 by the first mixer M1 and the second mixer M2.

A frequency conversion takes place, for example, from a baseband frequency range—in this case FRQ1—to an intermediate frequency range or to a carrier frequency range—in this case FRQ2.

In an advantageous development the D/A converter DAW of the transmitter device SE is connected on the output side to the transmission power amplifier AMP via a mixer M3, it being possible to convert the supplied signal to a third frequency range FRQ3 by the third mixer M3.

Assuming the first frequency range FRQ1 is a baseband frequency range, the second frequency range FRQ2 could then be an intermediate frequency range, while the third frequency range FRQ3 would then be a carrier frequency range.

In a further advantageous development the digital output signal AS1 of the first base station BTS1 is connected to the digital filter DF1 of the transmitter unit SE via a "switch" CPRI1 of what is referred to as a "Common Public Radio Interface" (CPRI).

Functions and embodiments of a known CPRI interface are known for example from the CPRI Specification, Version V2.0, 2004-10-01, which is published for example at the internet address www.cpri.info.

Figure 2:
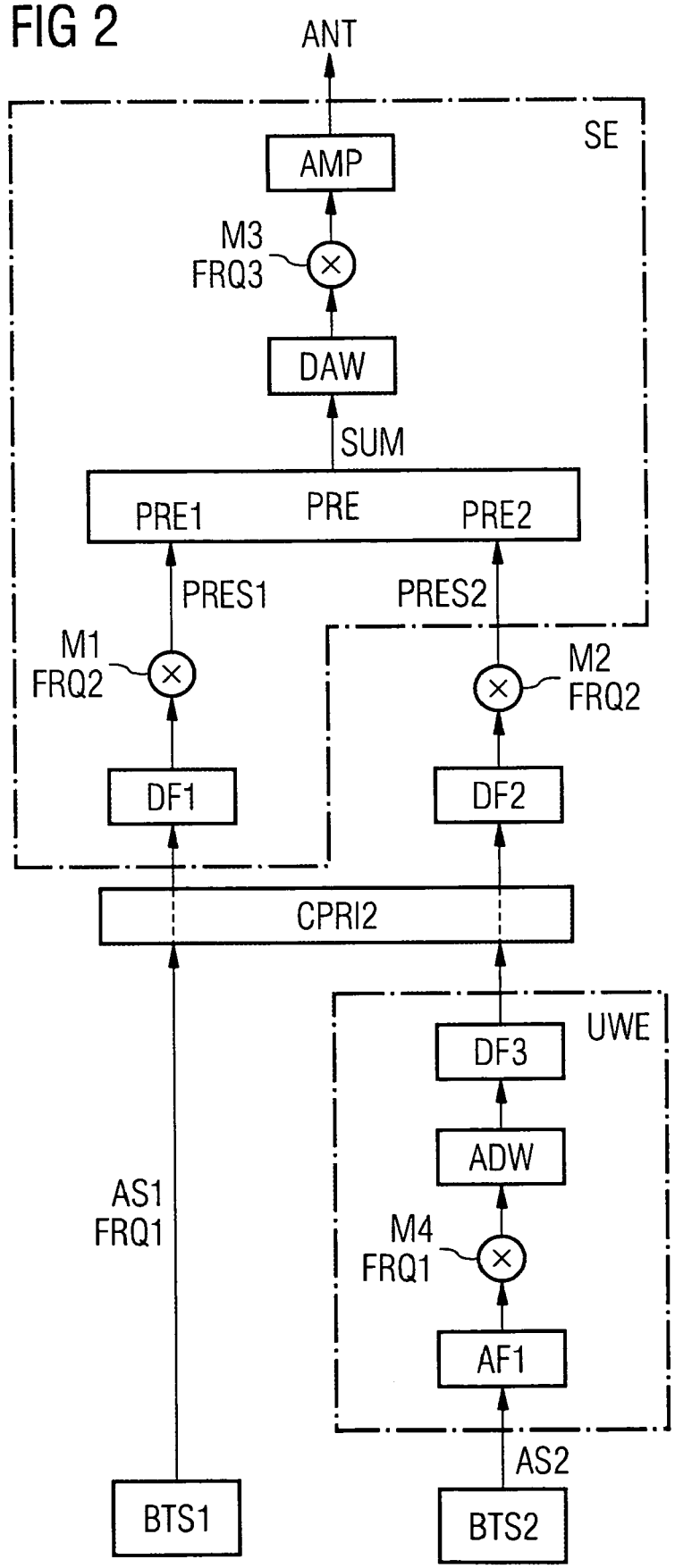
FIG. 2 shows a second embodiment of the system for combining a digital output signal of a first base station and an analog output signal of a second base station.

FIG. 2 shows, with reference to individual elements of FIG. 1, a second embodiment of the system for combining the digital output signal AS1 of the first base station BTS1 and the analog output signal AS2 of the second base station BTS2.

Again the digital output signal AS1 of the first base station BTS1 is led via a CPRI switch CPRI2 to the digital filter DF1 of the transmitter unit SE.

In addition the converting device UWE has a digital filter DF3 which is connected in series downstream of the A/D converter ADW on the output side. An output signal of the transmitter device SE, which signal was formed by the digital filter DF3, is likewise led via the CPRI switch CPRI2 and finally reaches the transmitter unit SE.

By transmitting via the CPRI interface it is possible to advantageously split the signal processing over two modules, a spatial separation of the two modules advantageously being possible.

In this manner what is referred to as, for example, a "tower-mounted radio" arrangement or a "remote radio head" with physically remote parts of a base station which can be expanded retroactively is made possible with little outlay in terms of effort and cost.

A first module is formed, for example, by the transmitter unit SE and the series circuit including the second mixer M2 on the one hand and the second digital filter DF2 on the other hand, while a second module is formed from the converting device UWE.

In this way the first module can be disposed close to the antenna, while the second module can be disposed, for example, remotely from the antenna at the foot of an antenna carrier mast.

FIG. 3 shows, with reference to elements of FIG. 1 and FIG. 2, a third embodiment of the arrangement for combining a digital output signal AS1 of the first base station BTS1 and a digital output signal AS3 of a second base station BTS3, wherein the output signals brought together by combining are radiated via the common antenna arrangement ANT.

Between the first base station BTS1 and the antenna arrangement ANT there is again disposed the transmitter unit SE which contains the first digital filter DF1, a predistorting device PRE, a D/A converter DAW and a transmission power amplifier AMP The first digital filter DF1 is connected to a first input PRE1 of the predistorting device PRE such that the digital output signal AS1 of the first base station BTS1 connected to the first digital filter DF1 reaches the predistorting device PRE as the first input signal PRES1.

The first input signal PRES1 is assigned, for example, to a first frequency range FRQ1—e.g. a baseband frequency range or a carrier frequency range or an intermediate frequency range.

The predistorting device PRE has a second input PRE2 to which a second input signal PRES2 is connected. From the first input signal PRES1 and the second input signal PRES2 the predistorting device PRE forms a predistorted aggregate signal SUM which finally arrives for radiating via the common antenna arrangement ANT.

The predistorting device PRE is connected to the antenna arrangement ANT via the D/A converter DAW and the transmission power amplifier AMP connected in series downstream thereof.

Known methods of digital predistorting are used for the predistortion. For example, a "clipping" method is utilized by which a reduced or, as the case may be, minimal "peak-to-average ratio" PAR is obtained.

The second base station BTS3 is directly or indirectly connected on the output side via a converting device UWE1 to the second input PRE2 of the predistorting device PRE in such a way that the output signal AS3 of the second base station BTS3 reaches the second input PRE2 of the predistorting device PRE as the second input signal PRES2.

In an advantageous development the converting device UWE1 has, connected to one another in series, a device for data recovery REC, a digital filter DF14, a device for digital frequency conversion RES and a further digital filter DF15.

The digital output signal AS3 of the second base station BTS3 is connected to the device for data recovery REC, while the digital filter DF15 can be connected on the output side to the second input PRE2 of the predistorting device PRE.

The digital output signal AS3 of the second base station BTS3 is converted to, for example, the first frequency range FRQ1 by the device for digital frequency conversion RES.

The digital output signal AS1 of the first base station BTS1, for example, is also assigned to said frequency range FRQ1.

The digital filter DF1 of the transmitter device SE is advantageously connected to the first input PRE1 of the predistorting device PRE via a mixer M1. Similarly, the digital filter DF15 of the converting device UWE1 is connected on the output side to the second input PRE2 of the predistorting device PRE via a CPRI switch CPRI3 and via a series circuit which contains a digital filter DF2 and a mixer M2.

The signals supplied in each case can be converted by the mixer M1 and the mixer M2 to a second frequency range FRQ2.

For example, with their assistance a frequency conversion takes place from a baseband frequency range—in this case FRQ1—to an intermediate frequency range or a carrier frequency range—in this case FRQ2.

The D/A converter DAW of the transmitter device SE is connected on the output side to the transmission power amplifier AMP via a mixer M3, whereby the supplied signal can be converted by the mixer M3 to a third frequency range FRQ3.

Assuming the first frequency range FRQ1 is a baseband frequency range, the second frequency range FRQ2 could be an intermediate frequency range, while the third frequency range FRQ3 could be a carrier frequency range.

In a further advantageous development the digital output signal AS1 of the first base station BTS1 is connected to the digital filter DF1 of the transmitter unit SE via the CPRI switch CPRI3.

The converting device UWE1 has a first device for clock recovery CREC1 to which the digital output signal AS3 of the second base station BTS3 is connected on the input side and which is connected on the output side to the device for data recovery REC.

The converting device UWE1 furthermore has a second device for clock recovery CREC2 to which an output signal of the switch CPRI3 is connected on the input side and which is connected on the output side to the device for digital frequency conversion RES.

This is necessary in the event that the first base station BTS1 uses a different clock system from the second base station BTS3. In this case the sampling rate is typically increased and a subsequent digital filtering performed for the purpose of converting to the clock system of the first base station BTS1.

If a conversion to the clock system of the first base station BTS1 is performed by a separate module, it is advantageous if the clock system of the first base station BTS1 is recovered or regained from the digital interface CPRI.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A system for combining output signals from first and second base stations for radiation from a common antenna arrangement, comprising:
   a transmitter unit provided between the first base station and the antenna arrangement, the transmitter unit containing a device for aggregate signal forming, a D/A converter and a transmission power amplifier, wherein the first base station has an output connected to the device for aggregate signal forming such that an output signal from the first base station serves as a first digital input signal to the device for aggregate signal forming; and
   a converting device to convert an analog signal produced by the second base station into a second digital input signal, which is supplied to the device for aggregate signal forming,
   wherein the output signal from the first base station is a digital signal and the output signal from the second base station is an analog signal, and
   wherein the device for aggregate signal forming forms an aggregate signal that reaches the antenna arrangement via the D/A converter and the transmission power amplifier such that signals carrying information originating from the first and second base stations respectively, are amplified together before wireless transmission from the antenna arrangement.

2. The system as claimed in claim 1, further comprising a first digital filter inserted between the device for aggregate signal forming and the first base station.

3. The system as claimed in claim 1, wherein the device for aggregate signal forming is a predistorting device.

4. The system as claimed in claim 3, wherein the predistorting device has first and second inputs.

5. The system as claimed in claim 1, wherein the converting device contains an analog/digital converter via which the analog signal produced by the second base station is converted from analog to digital form, so as to reach the device for aggregate signal forming as the second digital input signal.

6. The system as claimed in claim 5, wherein the converting device contains an analog filter which is connected between the second base station and the A/D converter such that the analog signal produced by the second base station reaches the A/D converter via the analog filter.

7. The system as claimed in claim 6, wherein
the converting device has a mixer which is disposed between the analog filter and the A/D converter, and
the mixer converts the analog signal of the second base station to a first frequency range.

8. The system as claimed in claim 5, wherein
a series circuit of a digital filter and a mixer is arranged between the A/D converter of the converting device and the device for aggregate signal forming,
the A/D converter has an output connected to the digital filter of the series circuit,
the mixer of the series circuit has an output connected to the device for aggregate signal forming, and
the mixer converts an output signal from the digital filter of the series circuit to a second frequency range.

9. The system as claimed in claim 8, wherein
a first digital filter is inserted between the device for aggregate signal forming and the first base station,
the transmitter unit has a mixer disposed between the first digital filter and the device for aggregate signal forming, and
the mixer converts an output signal of the first digital filter to the second frequency range.

10. The system as claimed in claim 1, wherein the output signal of the first base station is assigned to a first frequency range.

11. The system as claimed in claim 1, wherein
the transmitter unit has a further mixer connected between the D/A converter and the transmission power amplifier, and
said further mixer converts an output signal from the D/A converter to a third frequency range.

12. The system as claimed in claim 1, wherein
a first digital filter is inserted between the device for aggregate signal forming and the first base station, and
a common public radio interface CPRI switch is connected between the first base station and the first digital filter.

13. The system as claimed in claim 1, wherein a common public radio interface CPRI switch is disposed between the converting device and the transmitter unit in such a way that both the first and second digital input signals are supplied to the transmitter unit via the CPRI switch.

14. A system for combining output signals from first and second base stations for radiation from a common antenna arrangement, comprising:
- a transmitter unit provided between the first base station and the antenna arrangement, the transmitter unit containing a device for aggregate signal forming, a D/A converter and a transmission power amplifier, wherein the first base station has an output connected to the device for aggregate signal forming such that an output signal from the first base station serves as a first digital input signal to the device for aggregate signal forming; and
- a converting device connected between the second base station and the device for aggregate signal forming, the converting device producing a second digital input signal, which is supplied to the device for aggregate signal forming, the converting device having, connected to one another in series, a device for data recovery, a first digital filter, a device for digital frequency conversion and a second digital filter,
- wherein the device for aggregate signal forming forms an aggregate signal that reaches the antenna arrangement via the D/A converter and the transmission power amplifier such that signals carrying information originating from the first and second base stations respectively, are amplified together before wireless transmission from the antenna arrangement,
- wherein the second base station produces a digital output signal which is supplied to the device for data recovery,
- wherein the second digital filter produces the second digital input signal, which is supplied to the device for aggregate signal forming, and
- wherein the first and second base stations operate using different radio communication standards.

15. The system as claimed in claim 14, wherein
- a series circuit of a third digital filter and a mixer is positioned between the second digital filter of the converting device and the device for aggregate signal forming,
- the device for aggregate signal forming is embodied as a predistorting device,
- the second digital filter has an output connected to the third digital filter,
- the mixer of the series circuit has an output connected to the device for aggregate signal forming, and
- the mixer converts an output signal from the third digital filter into a second frequency range.

16. The system as claimed in claim 15, wherein
- the transmitter unit has a fourth digital filter and a second mixer positioned between the device for aggregate signal forming and the first base station, and
- the second mixer converts an output signal of the fourth digital filter to the second frequency range.

17. The system as claimed in claim 14, wherein a common public radio interface CPRI switch is disposed between the converting device and the transmitter unit in such a way that both the first and second digital input signals are supplied to the transmitter unit via the CPRI switch.

18. The system as claimed in claim 17, wherein
- the device for data recovery has a clock input,
- the device for digital frequency conversion has a clock input,
- the converting device has a first device for clock recovery to which the digital embodied output signal of the second base station is supplied, the first device for clock recovery producing an output signal that is supplied to the clock input of the device for data recovery, and
- the converting device has a second device for clock recovery, which receives an output signal from the CPRI switch, the second device for clock recovery producing an output signal that is supplied to the clock input of the device for digital frequency conversion.

19. The system as claimed in claim 14, wherein
- the device for data recovery has a clock input,
- the device for digital frequency conversion has a clock input,
- the converting device has a first device for clock recovery to which the digital embodied output signal of the second base station is supplied, the first device for clock recovery producing an output signal that is supplied to the clock input of the device for data recovery, and
- the converting device has a second device for clock recovery, which receives an output signal from the CPRI switch, the second device for clock recovery producing an output signal that is supplied to the clock input of the device for digital frequency conversion, wherein the first and second base stations communicate according to different radio communication standards.

* * * * *